No. 674,885. Patented May 28, 1901.
W. H. STRATTON.
PACKING.
(Application filed May 19, 1900.)
(No Model.)

Witnesses:
Wm H. Barker.
Arthur C. Jenkins.

Inventor:
William H. Stratton,
by Chas. L. Burdett
Attorney.

UNITED STATES PATENT OFFICE.

WILLIAM H. STRATTON, OF HARTFORD, CONNECTICUT.

PACKING.

SPECIFICATION forming part of Letters Patent No. 674,885, dated May 28, 1901.

Application filed May 19, 1900. Serial No. 17,247. (No model.)

*To all whom it may concern:*

Be it known that I, WILLIAM H. STRATTON, a citizen of the United States, and a resident of Hartford, in the county of Hartford and State of Connecticut, have invented certain new and useful Improvements in Packings, of which the following is a specification.

My invention relates to that class of packings used more especially for packing the space around a rotating part against the flow of fluid along such part; and the object of my invention is to provide a device of this kind that shall be compact, that shall be extremely durable and effective, and one that shall accommodate itself to all the varying conditions in use. One form of device in which this object may be attained is illustrated in the accompanying drawings, in which—

Figure 1:
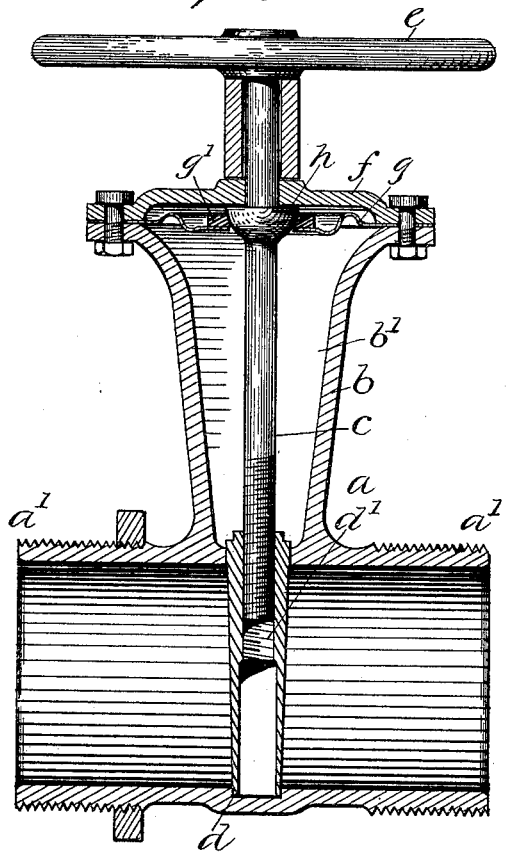
Figure 2:
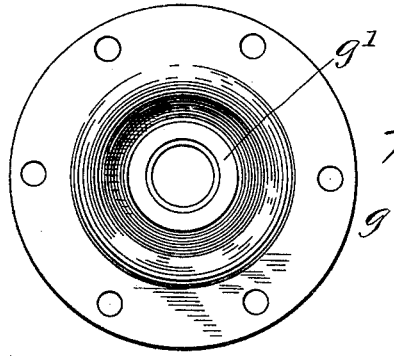

Figure 1 is a view in vertical section through a valve used in connection with a waterway and illustrating my invention. Fig. 2 is a plan view of the flexible packing.

While my invention is illustrated herein in connection with the valve-spindle of a valve as a device in connection with which it finds ready adaptation, I do not wish to be understood as limiting the invention to use with such a device, as it is equally applicable in any place in which it is desired to pack a spindle or other rotating part, and any use of the packing in connection with such parts will be understood as coming within the scope of the invention.

A serious objection has been found to many of the packings used prior to my invention from the fact that the packing is short lived and the consequent necessity of frequent repacking, and this is an extremely serious matter when the parts to be packed are located underneath the surface of the ground, not only on account of the increased frequency with which repacking is required, but also on account of the expense attending the uncovering of the parts to be packed. By my invention I have provided a packing in which these objections have been overcome to a great degree, the packing being so constructed as to be self-packing, the joint being, in fact, repacked or "self-repaired" each time the device is used, this rendering it practically free from the ill effects incident to the use of such devices and extremely durable. The peculiar construction of the joint also enables the production of a very compact structure, which is an important factor in devices of this class, especially when used in connection with a hydrant, as the position in which they are placed frequently requires a structure of the smallest possible dimensions, the size required in prior operative structures in many instances prohibiting their use.

In the accompanying drawings the invention is illustrated in connection with the valve in a waterway located on the hose-outlet of a hydrant, the letter $a$ denoting a valve-body having the ends of the branch $a'$ provided with means for connection to the water-pipe. A branch $b$ is located at an angle to the branch $a'$ and has formed therein a chamber $b'$, through which extends the spindle $c$ from a valve $d$. This valve $d$ is properly seated in the branch $a'$ to open or close the waterway therethrough. The valve has a screw-threaded opening $d'$, in which the screw-threaded end of the spindle $c$ fits, the valve being held against rotation, so that as the spindle is rotated, as by means of the hand-wheel $e$, the valve may be operated to open or close the waterway.

The mouth of the chamber $b'$ is closed by a cap $f$, secured in place as by means of bolts and nuts, the former passing through registering holes in flanges in the cap and branch $b$.

A packing-disk $g$ extends across the chamber $b'$, the edges of the disk being preferably clamped between the flanges on the cap $f$ and branch $b$. This disk is preferably formed of quite thin metal, with a thickened portion $g'$ about the edge of a central opening therethrough. This thickened part may be formed in any desired manner, as shown in the drawings a ring being secured to the disk. The disk is also formed in reverse curves or equivalent form when viewed in cross-section, as in Fig. 1, this form increasing the flexibility of the disk and also aiding in preserving the function as a packing.

A packing $h$ is secured to or formed on the spindle $c$, the packing-surface being formed in the shape of a portion of a sphere and cooperating with the packing-disk $g$ to pack the joint and prevent the flow of fluid through the spindle-opening in the cap $f$. The packing $h$ is provided with a shoulder lying against the under side of the cap $f$, preventing movement of the spindle in one direction, and a filling-piece $i$ opposes lengthwise movement of the spindle in the opposite direction.

The parts forming the packing may be ground to a fit, and the form of the packing $h$ and the uneven surface in the disk $g$ will always cause the joint to be securely packed, and each time the valve is opened or closed the seat is self-repaired. Should any slight defects be caused from long periods of disuse, the peculiar construction of the part enables this operation of repair to be practically indefinitely continued.

The invention is illustrated and described herein in connection with the hose-outlet of a hydrant, the device having ready adaptation and special advantages of use in connection with such a waterway, although it is obviously not limited to such specific use, as it is readily adapted for use in connection with fluidways in many devices and under varying conditions of use.

What I claim as my invention, and desire to secure by Letters Patent, is—

1. A rotating spindle extending through an opening to be packed against the flow of fluid, means for rotating the spindle, a packing secured to the spindle, a flexible packing-disk surrounding and coöperating with the packing on the spindle, and means for preventing lengthwise movement of the spindle.

2. A rotating spindle extending through an opening to be packed against the flow of fluid, means for rotating the spindle, a packing secured to the spindle and having its packing-surface formed like a portion of a sphere, a flexible packing-disk surrounding and coöperating with the packing on the spindle, and means for preventing lengthwise movement of the spindle.

3. A rotating spindle extending through an opening to be packed against the flow of fluid, means for rotating the spindle, a packing secured to the spindle, a flexible packing-disk surrounding and coöperating with the packing on the spindle and having an unevenly-formed surface, and means for preventing lengthwise movement of the spindle.

4. A rotating spindle extending through an opening to be packed against the flow of fluid, means for rotating the spindle, a packing secured to the spindle and having a shoulder thrusting against a stationary part to prevent lengthwise movement in one direction, a flexible packing-disk surrounding and coöperating with the packing on the spindle, and means for preventing lengthwise movement of the spindle in the opposite direction.

5. In combination a valve-body having a waterway, a sliding valve located in the waterway, a threaded valve-spindle fitting a threaded portion on the valve, means for rotating the spindle, a packing secured to the spindle, a flexible packing-disk surrounding and coöperating with the packing on the spindle, and means for preventing lengthwise movement of the valve-spindle.

6. In combination a valve-body having a waterway, a sliding valve located in the waterway, a threaded valve-stem fitting a threaded part on the valve, a cap secured to the valve-body and forming a bearing for the spindle, a packing secured to the spindle and thrusting against the cap to prevent movement in one direction, a flexible packing-disk surrounding and coöperating with the packing on the spindle, means located outside the valve-body for rotating the spindle, and also preventing movement in the opposite direction.

7. A rotating spindle extending through an opening to be packed against the flow of fluid, means for rotating the spindle, a packing secured to the spindle, a flexible packing-disk surrounding and coöperating with the packing on the spindle, said disk being formed in reverse curves when viewed in cross-section, and means for preventing lengthwise movement of the spindle.

8. In combination in a valve-body having a waterway, a sliding valve located in the waterway, a threaded valve-stem fitting a threaded part of the valve, a cap secured to the valve-body and forming a bearing for the spindle, a packing secured to the spindle and thrusting against the cap to prevent movement in one direction, a flexible packing-disk surrounding and coöperating with the packing on the spindle, said disk being formed in reverse curves when viewed in cross-section, and means located outside the valve-body for rotating the spindle.

9. A rotating spindle extending through an opening to be packed against the flow of fluid, means for rotating the spindle, a packing secured to the spindle and having a part-spherical surface, a flexible packing-disk surrounding the spindle and having a thickened portion adjacent to the opening coöperating with the packing on the spindle, and means for rotating the spindle.

WILLIAM H. STRATTON.

Witnesses:
CHAS. L. BURDETT,
H. L. PHILLIPS.